Aug. 23, 1927.

G. LAKHOVSKY 1,640,330

DIAPHRAGM FOR TELEPHONIC APPARATUS

Filed June 5, 1924

INVENTOR
Georges Lakhovsky
BY
ATTORNEYS

Patented Aug. 23, 1927.

1,640,330

UNITED STATES PATENT OFFICE.

GEORGES LAKHOVSKY, OF PARIS, FRANCE.

DIAPHRAGM FOR TELEPHONIC APPARATUS.

Application filed June 5, 1924, Serial No. 718,127, and in France June 14, 1923.

The experiments of the inventor have shown that, in apparatus for transmitting sounds, either emitting or receiving apparatus, e. g., receivers or transmitters, it is advantageous to arrange the movable plates or diaphragms in such a manner that they impart vibrations to the molecules of air in contact with them, but do not vibrate themselves. Under these conditions it is possible to avoid the distortion or destruction of the natural character of the sounds transmitted, which always takes place more or less in the ordinary apparatus.

This invention has for its object to provide a plate or diaphragm designed to set in vibration the adjacent layers of air without vibrating itself, its own resonance being neutralized or considerably diminished.

The vibrating diaphragm is constituted by means of two or more diaphragms, or metallic plates, with interposition between them of a damping material.

This material can be a plastic, or viscous substance, for instance, oil or a solution of rubber.

Moreover, the plates the assemblage of which forms the subject-matter of the invention are provided with ribs this giving them special properties as far as the damping of the vibrations is concerned.

Preferably the said plates are provided with similar ribs so as to exactly fit in each other.

The plate thus constituted is mounted in the casing of the apparatus by means of damping rings, made of rubber for instance, or of a single ring provided with an annular recess in which fits the edge of the plate.

Figure 1:
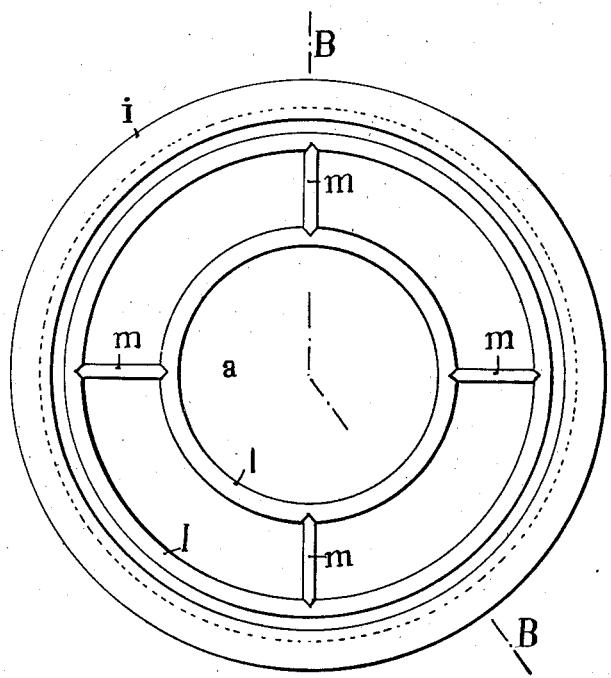
Figure 2:
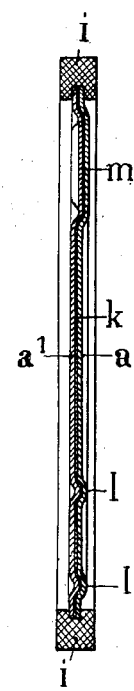

This invention is illustrated, but by way of example only, in the accompanying drawing in which:

Figure 1 is a plan view of the diaphragm; and Figure 2 is a section on line B—B of Figure 1.

Referring to the drawing $a$ and $a'$ represent two plates, each of which is ribbed and provided for instance, with concentric circular ribs $l$ and with radial ribs $m$. Between the plates $a$ and $a'$ is interposed a layer of viscous material $k$, such as a rubber solution, oil, vaseline or paraffin or any other viscous material having a damping action of the vibrations transmitted to it by one or the other of the said plates may be employed.

The whole is set or fitted in a rubber ring $i$ provided with an inner, annular slot or recess $j$ wherein exactly fits the edge of the plate constituted by the whole of the above elements.

This ring might be replaced by two rings made of rubber or other non-sonorous material (for instance, lead, ebonite, etc.) arranged on either side of the edge of the vibrating plate.

Experience shows that the plates and the system thus constituted give very good results concerning the pureness and clearness of the sounds and absence of distortion of the joints.

The diaphragm when mounted in a casing will, owing to the ring $i$, have no contact with the casing, so that it cannot transmit vibrations to the same and reversely.

The new vibrating plates or diaphragms are applicable to any apparatus for transmitting sounds, either emitting or receiving apparatus.

The above arrangement is given by way of example only; the form, materials and dimensions can be varied without departing thereby from the principle of the invention.

Claims:—

1. A diaphragm for sound sending and receiving apparatus formed of two thin discs provided with registering grooves, and a layer of viscous material interposed between the discs whereby the diaphragm is absolutely without tone.

2. A diaphragm for sending and receiving apparatus formed of two thin metal discs provided with registering grooves, a layer of viscous material interposed between the discs, whereby the diaphragm is absolutely without tone, and a rubber ring on the peripheries of the discs and retaining the viscous material between the said discs.

3. A diaphragm consisting of two thin metal discs, each provided with two concentric grooves, and radial grooves connecting the concentric grooves, the grooves of the discs registering, a layer of viscous material between the discs, and a rubber ring on the peripheries of said discs.

The foregoing specification of my "improvements in diaphragms for telephonic apparatus", signed by me this 21st day of May, 1924.

GEORGES LAKHOVSKY.